UNITED STATES PATENT OFFICE 2,483,962

STABILIZED HEAT POLYMERIZABLE COMPOSITIONS OF N-VINYL PYRROLE COMPOUNDS

Carl E. Barnes, Belvidere, N. J., assignor to General Aniline & Film Corporation, New York, N. Y., a corporation of Delaware No Drawing. Application February 3, 1945, Serial No. 576,156

3 Claims. (Cl. 260—315)

The present invention relates to polymerizable N-vinyl compounds and methods of polymerizing the same.

Polymeric N-vinyl compounds of the type disclosed in United States Patent No. 2,072,465 to Reppe, Keyssner and Dorrer, which may be obtained by polymerizing N-vinyl compounds, such as N-vinyl pyrrole, or N-vinyl compounds containing the pyrrole ring, such as N-vinyl carbazole, N-vinyl tetracarbazole, N-vinyl propyl carbazole, N-vinyl indole and N-vinyl naphthocarbazole, which, in turn, may be produced in the manner disclosed in United States Patent No. 2,066,160 to Reppe et al., have many unique and valuable properties which render them useful for wide application, particularly in the electrical field, as insulation. These polymers possess unusually high melting or softening points and, in addition, possess excellent electrical properties. However, the very properties which are valuable in these polymers hinder or prevent their use in certain applications. Particularly, the high melting point possessed by the polymers makes it very difficult to apply the polymer in many instances since the polymer will not flow readily even at the high temperature.

An illustration of an instance in which the application of a polymeric N-vinyl compound is quite difficult is the impregnation of porous materials, for instance paper. Such impregnated materials have found wide use in the electrical arts, due to their high dielectric constant. It is, however, extremely difficult to satisfactorily impregnate porous materials with a polymeric N-vinyl compound since these polymers will soften only at a high temperature and do not become sufficiently fluid to completely impregnate the paper. The use of a plasticizer to lower the melting point of the polymer is frequently undesirable since the high melting point is one of the desirable features. At times, satisfactory impregnation can be accomplished by employing a solution of the polymer in a suitable solvent, for instance, toluene or xylene. This is not always possible, however, since the removal of the solvent is frequently difficult and the impregnation obtained is frequently insufficiently dense to be satisfactory.

The above mentioned difficulties could be overcome if the material to be impregnated were impregnated with the monomer, since the monomeric N-vinyl compounds have a relatively low melting point, polyvinyl carbazole, for instance, melts at 65° C. and flows freely, and the monomeric N-vinyl compound, after impregnation, polymerized in situ by heat. It is, at times, possible to conduct this type of operation. However, considerable difficulty is encountered since the N-vinyl compounds rapidly polymerize at any temperatures above their melting point. In fact, a certain amount of polymerization occurs on standing at room temperature. The result is that, in many instances, when it is attempted to use the molten monomer, polymerization is so rapid that it causes substantial difficulties in the use of the monomer, if it does not prevent its use.

While various inhibitors are known for inhibiting or controlling the polymerization of monomeric N-vinyl compounds, such as: alkali metal or alkaline earth metal oxides, hydroxides or carbonates; heavy metals and their salts; monohydric and polyhydric alcohols, ethers and organic bases have been disclosed. However, the known polymerization inhibitors retard the polymerization to such an extent that their use is frequently objectionable or unnecessarily expensive since prolonged heating is necessary in order to bring about the polymerization of compounds containing such inhibitors. It has, therefore, generally been considered desirable to employ only relatively pure monomer which was free of inhibitors, if the polymerization was to be effected only by the action of heat. This is particularly true if it was at all desirable to effect the polymerization in a relatively short time, since if even a minor amount of known inhibitors were present in the monomer to be polymerized by heat, the polymerization would require a substantial period of time. In addition, many of the known inhibitors exert a marked adverse effect on the physical properties of the polymer, unless the inhibitor is removed from the polymer following polymerization.

It is, therefore, an object of the present invention to provide a polymerization inhibitor for N-vinyl compounds which will effectively inhibit the polymerization for a substantial period of time at temperatures slightly above the melting points of the monomeric N-vinyl compound but which will exert substantially no inhibiting effect at some higher, but still relatively low temperature.

I have discovered that stearyl alcohol, $C_{18}H_{37}OH$, is an extremely effective inhibitor and possesses the property of effectively inhibiting the polymerization of N-vinyl compound at temperatures slightly above their melting point but permits the polymerization to proceed rapidly at slightly more elevated temperatures. In addition, stearyl alcohol is effective as an inhibitor in extremely small amounts and, in the amounts which it is necessary to use, has no noticeable adverse effect on the physical or electrical properties of the monomer.

The stearyl alcohol may be mixed with the monomer in relatively minor amounts. Its inhibiting effect is noticeable when only a trace is present and amounts as low as 0.1% by weight of stearyl alcohol will effectively inhibit the polymerization for a substantial period of time. For most practical purposes, about .5% by weight of stearyl alcohol is satisfactory as an inhibitor, although larger amounts up to 5% may be employed without substantial disadvantage. The exact amount to be employed will, in general, depend on the length of time it is desired to inhibit the polymerization. As a general rule, it is sufficient if polymerization is inhibited for slightly more than a working day at a temperature of 5-10° C. above the melting point of the monomer and, therefore, sufficient stearyl alcohol is incorporated in the monomer to inhibit polymerization for this period of time. The amount of inhibitor employed should not exceed that which will inhibit the polymerization more than one hour at 120° C. The exact amount to be added can, therefore, readily be determined by experimentation.

The stearyl alcohol may be mixed with the monomeric N-vinyl compound in any desired manner. Thus, intimate mechanical mixing may be employed, or the stearyl alcohol may conveniently be added to a solution of the monomeric N-vinyl compound in a preferably volatile solvent, for instance, toluene; after mixing, the solvent may be removed advantageously by evaporation under reduced pressure, if necessary, in order to avoid polymerization. The dried monomeric N-vinyl compound thus obtained is then suitable for use.

The following specific examples illustrate the present invention:

*Example 1*

N-vinyl carbazole was mixed with 0.5% by weight of stearyl alcohol. The mixture was melted and held in a fused state at 70° C. for 50 hours. At the end of this period, no noticeable polymerization had occurred. The temperature was then raised to 120° C. and polymerization proceeded rapidly and was complete in 30 minutes.

*Example 2*

Radio condensers of the type ordinarily impregnated with oil or wax were, before impregnation, exhausted in the usual manner in a vacuum chamber. The vacuum was broken by admitting molten vinyl carbazole which contained 0.5% by weight of stearyl alcohol at a temperature of 70° C. and the condensers impregnated with the molten monomer in the usual manner. After the condensers had been impregnated, the molten monomer was permitted to drain from the impregnating tank and returned to a storage tank. The impregnated condensers were then heated to a temperature of 120° C. in an oven maintained at this temperature for 30 minutes. At the end of this period, the monomer had completely polymerized. The molten monomer in the storage tank was used to impregnate a large number of charges in the vacuum and impregnation tank and sufficiently fresh monomer, containing 0.5% stearyl alcohol, was added to the molten monomer, as needed, to make up for that used as an impregnator. No noticeable polymerization of the molten monomer in the storage tank could be detected, after several days operation.

The stabilized N-vinyl pyrrole containing a minor amount of stearyl alcohol, such as the compositions described in the above specific examples, are satisfactory for use in other casting type operation in which the monomeric compound is employed in molten state and then polymerized by heat. It should be understood that the term "casting" as employed in the present specification and claims includes such operations as impregnation and molding in which the stabilized monomer is employed in molten state and polymerized, in situ, after its application, by heating to a sufficient temperature to overcome the effect of the stabilizer.

While certain preferred specific embodiments of the present invention have been described in detail, it will be understood that the present invention is not strictly limited to them, and that various modifications may be made therein, as heretofore indicated, without departing from the spirit of this invention or the scope of the appended claims.

I claim:

1. As a heat polymerizable N-vinyl pyrrole composition which is stabilized to polymerization in the molten state at temperatures slightly above its melting point but which may readily be polymerized by heat at temperatures above 100° C., a heat polymerizable monomeric N-vinyl pyrrole compound having a melting point below 100° C. containing an effective amount, up to 5 percent, of stearyl alcohol to stabilize said N-vinyl pyrrole compound at temperatures slightly above its melting point.

2. As a heat polymerizable N-vinyl carbazole composition which is stabilized to polymerization in the molten state at temperatures slightly above its melting point but which may readily be polymerized by heat at temperatures above 100° C., monomeric N-vinyl carbazole containing an effective amount, up to 5 percent, of stearyl alcohol to stabilize said N-vinyl carbazole at temperatures slightly above its melting point.

3. As a heat polymerizable N-vinyl pyrrole composition which is stabilized to polymerization in the molten state at temperatures slightly above its melting point but which may readily be polymerized by heat at temperatures above 100° C., monomeric N-vinyl carbazole containing about 0.5% of stearyl alcohol.

CARL E. BARNES.

REFERENCES CITED

The following references are of record in the file of this patent:

UNITED STATES PATENTS

| Number | Name | Date |
|---|---|---|
| 2,072,465 | Reppe et al. | Mar. 2, 1937 |
| 2,129,478 | Rohm | Sept. 6, 1938 |
| 2,349,224 | Nill | May 16, 1944 |